US009879603B2

(12) United States Patent
Maguire et al.

(10) Patent No.: US 9,879,603 B2
(45) Date of Patent: Jan. 30, 2018

(54) AXIAL FLOW MACHINE COOLING SYSTEM

(71) Applicant: ROLLS-ROYCE PLC, London (GB)

(72) Inventors: Alan Robert Maguire, Derby (GB); Timothy John Scanlon, Derby (GB); Colin Young, Derby (GB)

(73) Assignee: ROLLS-ROYCE plc, London (GB)

( * ) Notice: Subject to any disclaimer, the term of this patent is extended or adjusted under 35 U.S.C. 154(b) by 265 days.

(21) Appl. No.: 14/458,593

(22) Filed: Aug. 13, 2014

(65) Prior Publication Data

US 2015/0047359 A1 Feb. 19, 2015

(30) Foreign Application Priority Data

Aug. 19, 2013 (GB) .................................. 1314773.1

(51) Int. Cl.
*F02C 7/18* (2006.01)
*F01D 5/08* (2006.01)
(Continued)

(52) U.S. Cl.
CPC ............... *F02C 7/18* (2013.01); *F01D 5/046* (2013.01); *F01D 5/08* (2013.01); *F01D 5/081* (2013.01);
(Continued)

(58) Field of Classification Search
CPC ...... F02C 6/08; F02C 7/12; F02C 7/18; F01D 5/081; F01D 5/082; F01D 9/06; F01D 25/12; F05D 2260/20; F05D 2260/205
See application file for complete search history.

(56) References Cited

U.S. PATENT DOCUMENTS 4,296,599 A * 10/1981 Adamson .................. F02C 7/18
415/115
4,807,433 A 2/1989 Maclin et al.
(Continued)

FOREIGN PATENT DOCUMENTS

GB 2 046 363 A 11/1980

OTHER PUBLICATIONS

Jan. 23, 2015 Search Report issued in European Application No. 14180792.
(Continued)

*Primary Examiner* — Carlos A Rivera
*Assistant Examiner* — Scott Walthour
(74) *Attorney, Agent, or Firm* — Oliff PLC

(57) ABSTRACT

This invention concerns a system for cooling components in a gas turbine engine, the gas turbine engine including a compressor for driving a primary gas flow to a combustor and a turbine arranged to be driven by combustion gases from the combustor, wherein the system includes: an annular cooling flow passage arranged for fluid communication between the compressor and the turbine, the flow passage having a first inlet arranged to receive gas from the primary gas flow downstream of compressor, and a second inlet located upstream of the first inlet, wherein the annular cooling flow passage has at least one internal wall for guiding airflow from the first inlet towards the airflow from the second inlet, the airflow from the first and second inlets coalesce within the annular flow passage prior to passing along the passage in a direction from the compressor to the turbine.

11 Claims, 3 Drawing Sheets

(51) Int. Cl.
*F02C 6/08* (2006.01)
*F01D 5/04* (2006.01)
*F01D 9/06* (2006.01)
*F01D 25/08* (2006.01)
*F02C 7/12* (2006.01)
*F01D 25/12* (2006.01)
*F02C 3/00* (2006.01)

(52) U.S. Cl.
CPC .............. *F01D 5/082* (2013.01); *F01D 9/06* (2013.01); *F01D 25/08* (2013.01); *F01D 25/12* (2013.01); *F02C 3/00* (2013.01); *F02C 6/08* (2013.01); *F02C 7/12* (2013.01); *F05D 2220/32* (2013.01); *F05D 2260/20* (2013.01); *F05D 2260/205* (2013.01); *Y02T 50/676* (2013.01)

(56) References Cited

U.S. PATENT DOCUMENTS

| | | | | |
|---|---|---|---|---|
| 5,555,721 A | * | 9/1996 | Bourneuf | F02C 7/18 415/115 |
| 5,996,331 A | * | 12/1999 | Palmer | F02C 6/08 415/115 |
| 2002/0172591 A1 | * | 11/2002 | Glynn | F01D 5/081 415/115 |
| 2003/0167775 A1 | | 9/2003 | Soechting et al. | |
| 2005/0268619 A1 | * | 12/2005 | Ress, Jr. | F01D 5/082 60/782 |
| 2007/0089430 A1 | | 4/2007 | Klinger | |
| 2008/0041064 A1 | * | 2/2008 | Moore | F01D 5/081 60/782 |
| 2008/0141679 A1 | | 6/2008 | Behaghel et al. | |
| 2010/0028137 A1 | * | 2/2010 | Argaud | F01D 11/04 415/176 |
| 2010/0154433 A1 | * | 6/2010 | Ottaviano | F02C 3/08 60/785 |
| 2010/0158668 A1 | * | 6/2010 | Ottaviano | F02C 3/08 415/104 |
| 2012/0060507 A1 | * | 3/2012 | King | F01D 5/081 60/782 |

OTHER PUBLICATIONS

Search Report issued in British Patent Application No. 1314773.1 dated Mar. 20, 2014.

Dec. 21, 2016 Office Action issued in European Patent Application No. 14 180 792.5.

* cited by examiner

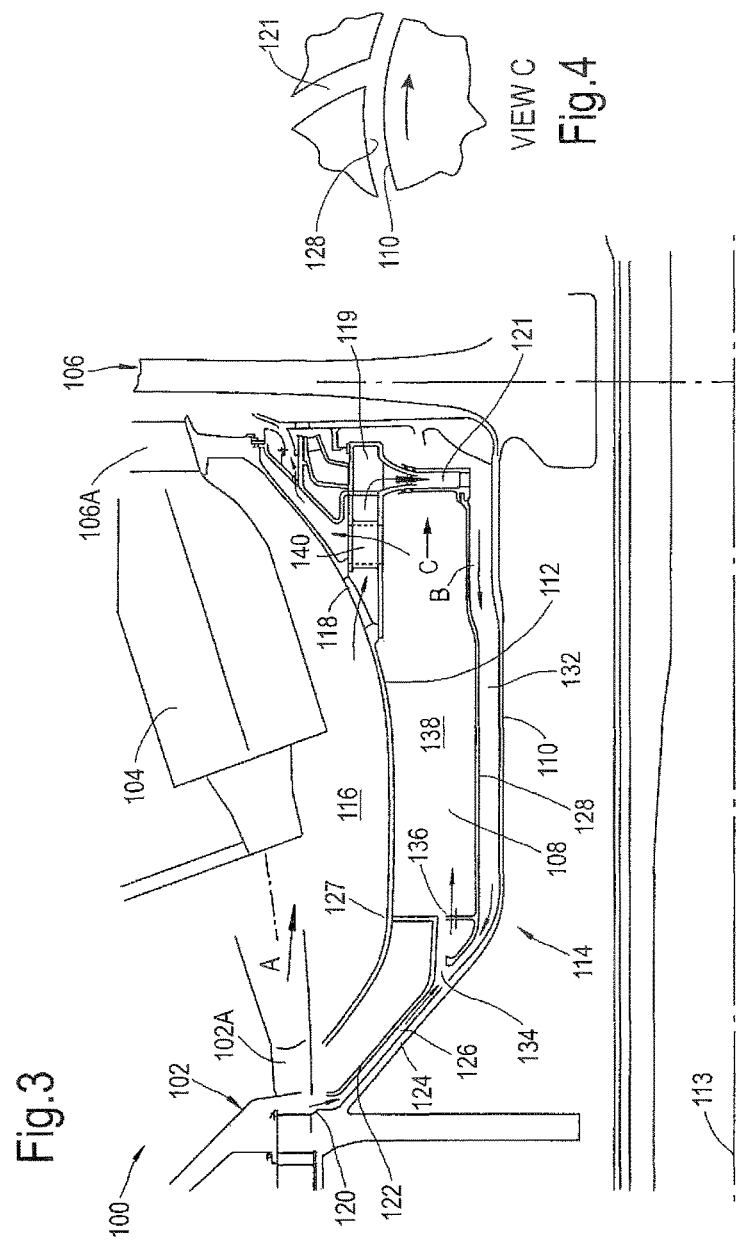

AXIAL FLOW MACHINE COOLING SYSTEM

This invention claims the benefit of UK Patent Application No. 1314773.1, filed on 19 Aug. 2013, which is hereby incorporated herein in its entirety.

BACKGROUND OF THE INVENTION

The present invention relates to the field of axial flow machine cooling or ventilation systems, and, more particularly, although not exclusively, to the field of gas turbine engine component cooling.

With reference to FIG. 1, a ducted fan gas turbine engine according to the prior art generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Alternative gas turbine engine arrangements may comprise a two, as opposed to three, shaft arrangement and/or may provide for different bypass ratios. Other configurations known to the skilled person include open rotor designs, such as turboprop engines, and turbojets, in which the bypass duct is removed such that all air flow passes through the core engine. The various available gas turbine engine configurations are typically adapted to suit an intended operation which may include aerospace, marine, power generation amongst other propulsion or industrial pumping applications.

When a gas turbine engine as shown in FIG. 1 is in operation many of the components of the engine, in particular those components in the high pressure sections immediately downstream of the combustor 16, experience temperatures which are in excess of 1500° C. Such high operating temperatures are often many hundreds of degrees greater than the actual melting points of the individual components, and it is therefore necessary to provide such components with a supply of coolant, such as air. It is generally desirable for the high pressure turbine to withstand as high a combustion exhaust temperature as possible, as this results in an increase in the level of thrust that the engine provides. Thus, there is a need to cool the high pressure turbine and other components immediately downstream of the compression system and combustor as efficiently as possible.

A typical way of providing a coolant duct for the high pressure section of a gas turbine engine is to provide a ventilation cavity located between the high pressure compressor and the high pressure turbine, which may then act as part of a cooling system for the high pressure turbine. Air is extracted from the boundary layer of the main gas path from the high pressure compressor, and fed to the high pressure turbine along the cavity. The air passing through the high pressure compressor has passed through multiple compressor stages and is thus relatively hot compared to ambient temperature, despite being cooler than the combustion exhaust temperature. The air which is extracted from the boundary layer has a higher temperature than the main gas path of the high pressure compressor, and this can have a detrimental impact on engine components both in the cavity, and in the high pressure turbine.

It is an aim of the present invention to provide a system in which an improved cooling flow regime is established so as to reduce thermal loading on the high pressure section of the engine.

BRIEF SUMMARY OF THE INVENTION

According to a first aspect of the invention there is provided a system for cooling components in a gas turbine engine, the gas turbine engine comprising a compressor for driving a primary gas flow to a combustor and a turbine arranged to be driven by combustion gases from the combustor, wherein the system comprises an annular cooling flow passage arranged for fluid communication between the compressor and the turbine, the flow passage having a first inlet arranged to receive gas from the primary gas flow downstream of the compressor, and a second inlet located upstream of the first inlet, wherein the annular cooling flow passage has at least one internal wall for guiding an airflow from the first inlet towards an airflow from the second inlet, such that the airflow from the first and second inlets coalesce within the annular flow passage and towards the compressor end of the annular flow passage, prior to passing along the flow passage in a direction from the compressor to the turbine, and
wherein the annular flow passage comprises first and second outer walls, the first outer wall comprising a shaft arranged for rotation in use and the second outer wall being disposed at a greater radial distance from an axis of the annular flow passage than the first outer wall, and wherein the internal wall is arranged to direct flow from at least the first inlet onto the first outer wall.

The internal wall may guide the airflow in the reverse direction along part, or all of the annular cooling flow passage.

The internal wall may guide the flow along the first outer wall in the reverse direction so as to cool said first outer wall in use.

The inlet (e.g. that provides the reverse air flow) may be located towards a turbine end of the flow passage, for example closer to a turbine end of the flow passage than a compressor end of the flow passage.

The inlet may comprise a nozzle. The nozzle may direct cooling flow onto the first outer wall at or adjacent to a turbine end of the flow passage.

The nozzle may comprise one or more orifice or opening, such as for example, one or more opening between spaced flow guide members. The nozzle and/or flow guide member may comprise one or more aerofoils. The nozzle and/or flow guide member(s) may be angled in a direction that is substantially the same as the direction of rotation of the compressor or turbine, and/or the first outer wall of the annular flow passage. The nozzle may increase the tangential velocity of the gas received from the first inlet, for example such that it is closer to the tangential velocity of the first outer wall. This may provide the benefit of reducing the frictional heating of the gas received from the first inlet, thereby increasing the cooling capabilities of the airflow.

One or more further inlet may be provided to the annular cooling passage. Any such inlet(s) may also comprise a nozzle.

The internal wall may comprise a discontinuity part way along the length of the flow passage. The discontinuity may be closer to the compressor end of the flow passage than the turbine end. The discontinuity may be an end or opening in the internal wall. An edge of the internal wall defining the discontinuity may or may not be annular in form. The internal wall may or may not comprise a lip or curved edge at the discontinuity.

The gas flow from the inlet may turn about the discontinuity, for example towards the turbine end of the flow passage. The internal wall may advantageously define a flow path through the flow passage that is greater in length than the first and/or second outer wall. The internal wall may define a reverse flow portion of the flow passage on one side thereof and a forward flow portion of the flow passage on the other side thereof.

The second inlet may enter into the flow passage at or adjacent to a compressor end thereof. The second inlet may be arranged to receive a secondary gas flow from the compressor. The second inlet may be provided in a peripheral/circumferential wall of the compressor. The second inlet may be immediately downstream of a final rotor blade array in the compressor, for example between the final rotor and stator array of the compressor. The second inlet may or may not be formed in the second outer wall. The secondary gas flow may be gas from a boundary layer flow in the compressor. The gas received at the second inlet may be at a higher temperature and/or greater swirl than the temperature of the gas received at the first inlet.

The flow passage may comprise a first portion which is substantially parallel with the axis of rotation, for example depending from a turbine end of the passage. The flow passage may comprise a second portion which is angularly offset relative to the first portion, for example towards or depending from the compressor end of the passage. The second portion may be angled, e.g. obliquely, away from the axis of rotation. The height of the second portion may be less than that of the first portion.

The second inlet may open into the second portion of the flow passage.

The internal wall discontinuity may be at or adjacent to a location at which the first and second flow passage portions meet, such as an elbow.

The internal wall may be a first internal wall. The annular cooling flow passage may have a second internal wall which is immediately adjacent to the second inlet. The second internal wall and the first outer wall may define a second portion of the passage. The flow from the second inlet along the second portion may be in the forward direction, e.g. from the compressor to the turbine.

The second portion may have a height that is substantially smaller than the total height of the annular cooling flow passage. The second portion may have a height that is less than 25% of the height of the annular cooling flow passage.

The second portion may be annular in form. This provides the benefit of controlling airflow from the second inlet, thereby avoiding recirculation of the airflow which may cause further heating of the airflow.

The first and second internal walls may be spaced, for example so as to define a flow opening (e.g. the discontinuity) between the adjacent ends thereof. The flow opening may be annular in form.

The respective flows from the first and second inlets may meet at the discontinuity or flow opening. The first and second flows may be in opposing directions and may advantageously turn through the discontinuity, for example to form a common flow. The first and second flows may coalesce or mix at and/or downstream of the discontinuity. The region of the passage downstream of the discontinuity may be a forward flow or third portion of the flow passage. That portion may be substantially parallel to the first portion of the passage but spaced therefrom by the internal wall. As airflow at the second inlet is typically at a higher temperature than the airflow at the first inlet, the first inlet flow can beneficially be used to cool the first outer wall, thereby reducing the thermal loading thereon prior to mixing with the second inlet flow. The single mixed cooling airflow can then be directed towards the turbine, in a forward/downstream direction.

The third flow passage portion may be formed between the first internal wall and the second outer wall. The height of the third flow passage portion may be greater than that of the first and/or second flow passage portion. Thus the flow may diffuse and mix to a greater extent in the third flow passage portion. The third flow passage portion may have a height that is in the range of 50% to 85% of the height of the annular cooling flow passage. The third flow passage may have a height that is substantially 80% of the height of the annular cooling flow passage.

Any or any combination of the first, second and/or third flow passage portions may be elongate in form, for example having a length that is substantially greater than the height thereof. The length of the third flow passage may be between 3 to 6 times the height of the third flow passage.

The internal wall may depend from a turbine end of the flow passage and may be supported at a location spaced therefrom. A support member may depend from the second outer wall. The support member may extend between the second outer wall and the first internal wall. The support member may contact the first internal wall at, or adjacent to, the discontinuity and/or the point at which the first and second flow passage portions meet. The support member may comprise one or more flow opening therein, which may open into the third portion of the flow passage. The flow opening may be immediately downstream of the discontinuity. In an alternative embodiment, the flow opening in the support may comprise the discontinuity.

The support member may be further attached to the second internal wall. The support member may be a common support for both the first and second internal walls. The support member may be located towards the compressor end of the annular cooling flow passage.

The ratio of airflows from the first and second inlets may be controlled by restricting formations located within the annular cooling flow passage. The restricting formations may take the form of orifices and/or aerofoils. The ratio of airflows from the first and second inlets may be within the range of 90:10 to 10:90. The ratio of airflows from the first and second inlets is preferably within the range of 70:30 to 30:70.

The compressor is preferably a high pressure compressor. The turbine is preferably a high pressure turbine.

The flow from the cooling passage may be fed to the turbine, for example by one or more further passages or ducts. The turbine may comprise a turbine disc and the flow from the cooling passage may be directed to the disc in order to cool the disc in use. The flow from the cooling passage may be directed to cool a seal member of the turbine disc and/or a head portion of the turbine disc.

The turbine may comprise a plurality of aerofoils. Each aerofoil may comprise a plurality of internal channels. The internal channels may be in fluid communication with the annular cooling flow passage. A further cooing flow source may be mixed with the flow from the cooling passage prior to delivery to the internal channels.

In any example of the invention, a downstream direction (e.g. through the engine) may be defined as a primary gas flow or a global flow direction from the compressor to the combustor. The reverse direction may be an upstream direction.

According to a second aspect of the invention, there is provided a system for cooling components in a gas turbine engine, the gas turbine engine comprising a compressor for driving a primary gas flow to a combustor and a turbine arranged to be driven by combustion gases from the combustor, wherein the system comprises: an annular cooling flow passage arranged for fluid communication between the compressor and the turbine, the flow passage having a first inlet arranged to receive gas from the primary gas flow downstream of the compressor, and a second inlet located upstream of the first inlet, wherein the annular cooling flow passage has at least one internal wall for guiding airflow from the first inlet towards the airflow from the second inlet, such that the airflow from the first and second inlets coalesce within the annular flow passage prior to passing along the flow passage in a direction from the compressor to the turbine.

Any of the preferable features defined above in relation to the first aspect may be applied to the second aspect.

BRIEF DESCRIPTION OF THE DRAWINGS

Practicable embodiments of the invention are described in further detail below by way of example only with reference to the accompanying drawings, of which:

FIG. 3 shows a half longitudinal section through a cooling passage system according to an example of the present invention.

FIG. 4 shows a cross sectional view of the nozzle where it meets the annular cooling flow passage viewed along the axial direction of the gas turbine engine.

DETAILED DESCRIPTION OF THE INVENTION

Figure 2:
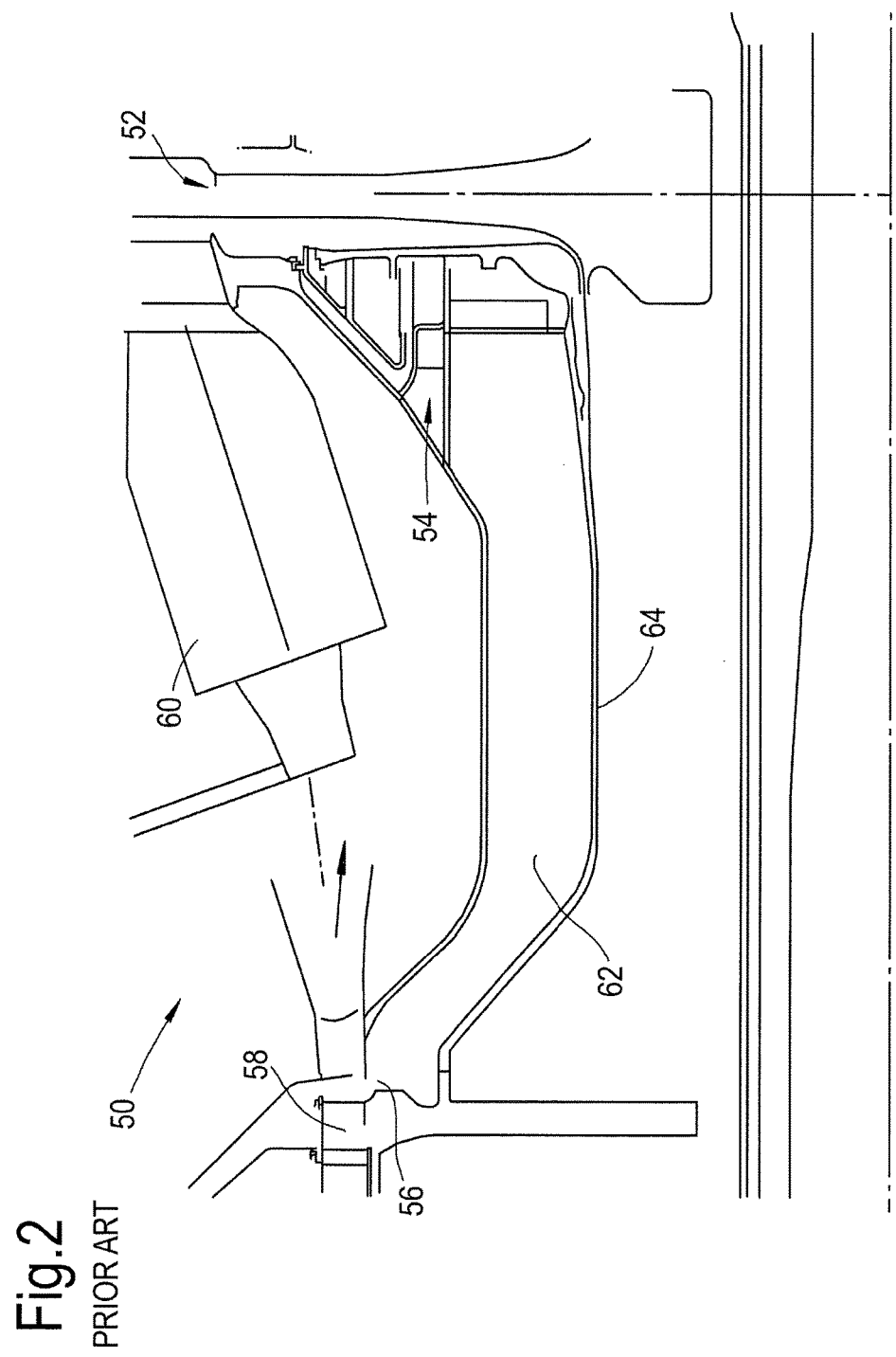
FIG. 2 shows a half longitudinal section through a cooling passage system according to the prior art.

Referring to FIG. 2, there is shown a ventilation cavity system, generally designated 50, according to the prior art. In such a system 50, airflow from the compressor enters turbine 52 cooling flow ducting from first 54 and second 56 inlets. The first inlet 54 is fed by the primary flow of gas produced by the compressor 58. Such an airflow has been diffused as it is passed from the compressor into the larger volume surrounding the combustor 60, prior to entering the inlet 54 to provide a first cooling stream of air for the components of the turbine 52.

The airflow from the second inlet 56 is typically drawn from a boundary layer of the airflow through the compressor and enters the ventilation cavity 62. Such an airflow from the boundary layer is at a higher temperature than the temperature of the primary airflow through the compressor.

The airflow from the second inlet 56 passes along the shaft 64 connecting the high pressure compressor 58 to the high pressure turbine 52 so as to cool the rotating shaft 64 in use. However it has been determined by the inventor that, as the airflow from the second inlet 56 is still at a relatively high temperature, the cooling effect of the airflow can be insufficient, and can have a detrimental impact on various structural parts of the cavity 52, to the extent that the operating temperatures approach the material limits of the cavity 62, particularly for high Overall Pressure Ratio (OPR) engine cycles.

This problem is exacerbated by the desire to increase cooling efficiency of the turbine 52 and thus it is generally desirable to derive a majority of the cooling flow from inlet 54, thereby further reducing the cooling of the components of the cavity 62.

Furthermore, the airflow through the cavity 62 has been analysed and it has been found that the internal structure of the cavity 62 near the second inlet 56 is such that a recirculation of the airflow often occurs. The recirculation of airflow causes frictional heating of the air by the rotating high pressure compressor drive arm, and thus results in a further increase in temperature of the already hot airflow from the second inlet 56. Such an increase in temperature has the potential for damage of the cavity 52 over prolonged operation.

Referring to FIG. 3, there is shown a system 100 for cooling components in a gas turbine engine, according to an example of the present invention. The gas turbine engine is of the type shown in FIG. 1, and comprises a high pressure compressor 102, a combustor 104, and a high pressure turbine 106. The system 100 comprises an annular cooling flow passage 108.

Figure 1:
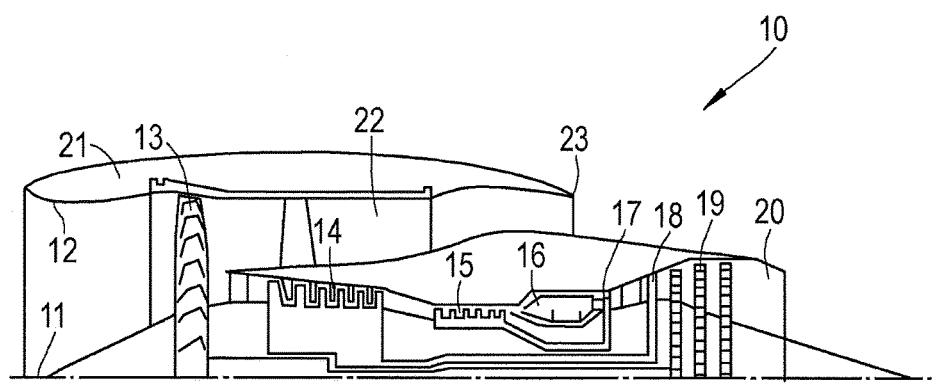
FIG. 1 shows a sectional view of a conventional ducted fan gas turbine engine.

The annular cooling flow passage 108 is defined between first 110 and second 112 walls. The first wall 110 is an outer wall of the rotating shaft 114 which connects the compressor 102 and the turbine 106. The shaft 114 is thus a body of revolution (typically being hollow and circular in cross section) arranged for rotation about axis 113, which comprises the primary engine axis (e.g. axis 11 as shown in FIG. 1). The shaft extends in the direction of the axis 113 over a majority of its length but comprises a conical portion 124 toward the compressor end thereof. That conical portion is obliquely angled or sloped relative to the axis and serves as the compressor drive arm.

The shaft 114 is heated in use by friction and at least in part by its proximity to the combustor 104 and conducting relationship with the high pressure turbine 106.

The second wall 112 is a static wall, which is circumferential in form and concentric with the first wall 110. The second wall is spaced further from the axis 113 than the first wall, with the shape of the cooling passage 108 being defined therebetween. The second wall 112 is rigidly mounted between the compressor outlet guide vanes 102A and the turbine inlet nozzle guide vanes 106A. The second wall 112 defines at least a portion of the flow passage 108 on its radially inner side and also a portion of the wall defining the cavity 116 about the combustor 104 on its radially outer side.

The flow passage 108 is provided with first 118 and second 120 inlets. The first and second inlets may extend about the axis 113 or may comprise a series of openings circumferentially aligned about axis 113.

The second inlet 120 is provided in a radially inner circumferential wall of the compressor 102, immediately behind of the downstream-most array of compressor blades in the direction of flow through the compressor. The inlet 120 is provided between the rotating blade array and the compressor outlet guide vane array 102A. The inlet 120 opens in a radial direction relative to the axis of rotation 113 such that air is fed to the inlet from the boundary layer of the flow through the compressor when in use.

The first inlet 118 is located in the static wall 112 towards a downstream end of the flow passage 108. The first inlet is preferably part way (e.g. approximately half-way) along the length of the combustor 104 in a longitudinal direction but positioned radially inwardly thereof. The first inlet 118 opens into the cavity 116 to receive air therefrom in use.

The inlet 118 defines the opening to a duct 119 leading from the inlet to the flow passage 108, which turns radially inward towards the wall 110 and axis 113. A nozzle arrangement 121 is provided downstream of the first inlet 118 in duct 119. The nozzle 121 typically takes the form of a plurality of flow guides, such as aerofoils, arranged to induce a swirl component to the airflow prior to entering the flow passage 108. The flow guides may be angled relative to the axis 113 and to each other so as to accelerate the flow passing therethrough. The nozzle 121 induces swirl in a direction that is substantially the same as the direction of rotation of the shaft 110 connecting the compressor 102 and the turbine 104. As is shown in FIG. 4, the nozzle 121 may be angled in a direction that is substantially the same as the direction of rotation of the first outer wall 110 of the annular cooling flow passage 108.

A first flow-guiding internal wall 128 within the flow passage 108 extends from the turbine end of the passage 108 (i.e. adjacent the nozzle 121) along a majority of the length of the passage interior. The flow guiding wall 128 extends from the turbine end towards the compressor 102 in a direction substantially parallel with the shaft 110. The gap between the flow guiding wall 128 and the rotating wall 110 define a first annular portion 132 of the flow passage 108. That first portion 132 has a height which is substantially less than the height of the annular cooling flow passage 108, such as for example 15-25% of the height of flow passage 108.

The internal wall 128 is supported at the turbine end relative to wall 112 by the nozzle arrangement 121. The wall 128 is also supported towards the compressor end of the flow passage 108, relative to the wall 112 by a support formation in the form of bracket/flange 127, which depends radially inwardly from the wall 112. The wall is mechanically connected to the support member 127 by a fastener such as a bolt.

A second flow guiding wall 122 extends from the second inlet 120, along the interior of the flow passage 108. The wall 122 is substantially parallel to a sloped portion 124 (i.e. the compressor drive arm) of the rotating shaft wall 110, and defines a second portion 126 of the flow passage 108. The wall 122 terminates at the support member 127 which depends inwardly from static wall 112. The support member 127 is located in a longitudinal direction substantially at the end of sloped portion 124, e.g. at an elbow formed between the drive arm 124 and the remainder of the high pressure shaft 114.

The support member 127 provides a common support for both the first 128 and second 122 internal walls of flow passage 108.

The wall 122 extends for approximately 75% of the length of the sloped portion 124 of the rotating wall 110. The flow passage 126 has a height which is substantially less than the height of the annular cooling flow passage 108, and typically less than the height of the first portion 132. This height difference is important as it causes the flow of air along the second portion 126 at relatively high velocity so as to improve the cooling effect thereof on the sloped wall 124.

The terminating ends/edges of the flow guiding walls 122, 128 are spaced in the region of the support member 127, so as to form a discontinuity in the form of a flow opening 134, which is typically annular in form. The opposing edges of the first 128 and/or second 122 walls may be curved to form a lip formation so as to define smooth edges into the opening and to thereby reduce loss of energy in the flow as it turns about the opening 134 as will be described below.

The adjoining wall connecting wall 128 to support member 127 is provided with opening 136 which defines an internal inlet to a further/third portion 138 of flow passage 108. The opening 136 extends about the axis 113 and is generally annular in form. The opening may comprise a plurality of openings, each comprising a portion of the annulus with wall portions therebetween so as to adequately support the wall 128.

The third flow passage 138 is defined between the static wall 112 and the first flow guiding wall 128. The third portion 138 has a height that is between 75% and 85% (e.g. approximately 80%) of the height of the annular cooling flow passage 108. The length of the flow passage 138 is around five times the height of the flow passage 138, so that the flow passage 138 is elongate in form.

The third portion extends from its inlet at 136 towards outlet 140 at the turbine end of the flow passage 108. The outlet 140 in this example opens radially outwardly into ducting which delivers the cooling flow to the turbine 106.

In use the compressor 102 drives a primary flow of air into and through the cavity 116 towards the turbine 106 in the direction of arrow A. As the air passes through the cavity 116, which is of greater flow area than the compressor, it is diffused, thereby creating a flow of air which has a relatively high static pressure and even temperature. A portion of this flow of air passes from the cavity 116 into the inlet 118 and then to the annular cooling flow passage 108.

The airflow passes from the first inlet 118 into the flow passage 119 and is turned towards the wall 110. The nozzle 121 that is disposed within the flow passage 119 acts to increase the tangential velocity of the gas received from the first inlet 118 such that it matches or approaches the tangential velocity of the shaft 114. This provides the benefit of minimising the frictional heating of the cooling flow as it impinges on wall 110 thereby increasing the cooling efficiency.

The airflow is guided by wall 128 in a reverse/upstream direction along the first portion 132 in the direction of arrow B such that it impinges upon and thereby cools the outer wall 110 of the shaft 114. Thus the shaft 114 is cooled by the airflow from the first inlet 118 during use.

A further cooing airflow is fed from a boundary layer of the compressor 102 flow, and passes through the second inlet 120. The airflow is guided by wall 122, along flow passage 126, towards the interior of the annular cooling flow passage 108. The flow passage 126 is relatively narrow in comparison with the annular cooling flow passage 108, and the narrow nature of the flow passage 126 prevents recirculation of the airflow from the second inlet 120 therein. This therefore prevents the increase in temperature of the airflow that is present in the prior art.

Airflows from the first 118 and second 120 inlets meet at the flow opening 134 defined by the terminating ends of the guiding walls, 122,128. Such airflows coalesce so as to form a single cooling airflow which turns through the opening 134 in a downstream direction towards the turbine end of the flow passage and to the outlet 140.

The single cooling airflow passes from the flow opening 134, through the aperture(s) 136 that are located in the support member 127, and into the flow passage 138. Due to the elongate nature of the flow passage 138, the single cooling airflow is able to diffuse along the length of the flow passage 138, resulting in a less energetic airflow and improved mixing.

The single cooling airflow passes from the flow passage 138 to the turbine 106, and is therefore able to reduce the operating temperature of the components of the turbine 106. As depicted in FIG. 3, the airflow cools the turbine disc outer seal and outer portion of disc head. An alternative embodiment would be to combine this flow with the conventional turbine blade cooling flow in order to cool the HPT blades.

The invention is particularly advantageous in that the cooling efficiency for the shaft 114, particularly the compressor and turbine drive arms, is increased by providing a direct cooling path from inlet 118 prior to mixing with the hotter boundary layer air from inlet 120. This is achieved by providing an internal wall arrangement that can guide the air from the inlet 118 firstly in a reverse direction, followed by a forward direction with respect to the global flow from the compressor to the turbine. Thus the internal wall 128 creates an internal flow path within the passage 108 that is of greater length than the passage itself.

According to aspects of the invention, the flow passage 108 comprises an internal wall arrangement that allows the coolant flow to pass firstly in one direction along one outer wall of the annular flow passage and subsequently in an opposing direction along the other outer wall of the passage.

The embodiments described above are also beneficial in that they can be accommodated within a conventional engine architecture, such as by making use of the existing annulus gap between the high pressure compressor rotor and outlet guide vanes, and does not therefore require complex redesign of adjoining components or assemblies.

In other embodiments of the invention, the inlet preswirling nozzle 121 could be omitted. Additionally or alternatively, the internal geometry of the flow passage 108 could be modified such that the flow from inlet 118 could be mixed/coalesced with the flow from inlet 120 prior to flowing along the wall 110. In such an embodiment, the inlet 118 could be located further forward towards the compressor, for example closer to the vicinity of the support formation 127. Such an embodiment may provide an improvement over the prior art cooling system of FIG. 2, albeit with reduced cooling of the turbine end of the shaft 114.

In any example of the invention one or more further inlets, in addition to the first inlet 118, may be provided, typically in the static annular wall of the flow passage 108 for providing flow to the annular flow passage. Such further inlet(s) could be provided at a different axial locations between the turbine and compressor from that of the first inlet 118 but may otherwise be similar in form to the first inlet. Where multiple first inlets are employed in this manner, the flow into the cooling passage via the second inlet 120 shall be typically within 30-70% of the total flow into the passage.

In light of the above description of various different embodiments, it will be appreciated that the invention provides a ventilation system that supplies a cooling flow of air to the turbine components upon exiting the ventilation system. Turbine components cooled by the ventilation system may be seals, discs, cooled blades or nozzle guide vanes.

What is claimed is:

1. A system for cooling components in a gas turbine engine, the gas turbine engine comprising a compressor for driving a primary gas flow to a combustor and a turbine arranged to be driven by combustion gases from the combustor, wherein the system comprises:

an annular cooling flow passage arranged for fluid communication between the compressor and the turbine, the annular cooling flow passage having a first inlet arranged to receive gas from the primary gas flow from a cavity disposed about the combustor and downstream of the compressor, and a second inlet located in a radially inner circumferential wall of the compressor and upstream of the first inlet, wherein the annular cooling flow passage comprises a first portion that is substantially parallel with an axis of rotation at a turbine end of the annular cooling flow passage and a second portion towards the compressor end of the annular cooling flow passage, the second portion being angularly offset relative to the first portion, wherein the second inlet opens into the second portion of the annular cooling flow passage, and wherein the annular cooling flow passage has a first internal wall for guiding an airflow from the first inlet towards an airflow from the second inlet, and a second internal wall for guiding an airflow from the second inlet along the annular cooling flow passage towards the airflow from the first inlet, the second internal wall being located in the second portion of the annular cooling flow passage, such that the airflows from the first and second inlets coalesce within the annular cooling flow passage and towards a compressor end of the annular cooling flow passage, prior to passing along the annular cooling flow passage in a direction from the compressor to the turbine, and wherein the annular cooling flow passage comprises first and second outer walls, the first outer wall comprising a shaft arranged for rotation in use and the second outer wall being disposed at a greater radial distance from an axis of the annular cooling flow passage than the first outer wall, the first outer wall comprising a first portion and a second portion, the second portion of the first outer wall being obliquely angled relative to the first portion of the first outer wall, and wherein the first internal wall is arranged to direct the airflow from the first inlet along the first outer wall, and wherein the system further comprises a nozzle in a flow path between the first inlet and the first outer wall, the nozzle arranged to induce swirl in the airflow from the first inlet, and the nozzle being angled in a direction that is substantially the same as a direction of rotation of the first outer wall of the annular cooling flow passage, and wherein the second internal wall defines a flow path having a height that is less than a height of a flow path defined by the first internal wall, and wherein a first portion of the first internal wall extends along the first portion of the first outer wall and a second portion of the first internal wall extends along the second portion of the first outer wall.

2. The system according to claim 1, wherein the second portion of the first outer wall is interposed between the first portion of the first outer wall and the compressor end of the annular cooling flow passage, wherein the airflows from the first and second inlets coalesce in the vicinity of a location at which the first and second portions of the first outer wall meet.

3. The system according to claim 1, wherein the first internal wall is arranged to guide the airflow from the first inlet along the annular cooling flow passage in a reverse direction from the turbine towards the compressor.

4. The system according to claim 1, wherein the first inlet is located towards a turbine end of the annular cooling flow passage.

5. The system according to claim 1, wherein the first internal wall comprises a discontinuity located along the annular cooling flow passage closer to the compressor end of the annular cooling flow passage than a turbine end, the first internal wall being arranged to guide the airflow from the first inlet to the discontinuity, wherein the airflow from the first inlet turns about the discontinuity to travel in a direction from the discontinuity towards the turbine end of the annular cooling flow passage.

6. The system according to claim 1, wherein the first internal wall extends in a second direction from a turbine end of the annular cooling flow passage, the second direction being substantially parallel with the first outer wall of the annular cooling flow passage.

7. The system according to claim 1, wherein the first internal wall and the second internal wall are supported by a common support member depending from the first outer wall of the annular cooling flow passage or the second outer wall of the annular cooling flow passage.

8. The system according to claim 1, wherein the first internal wall is arranged to form a first flow path between a first side of the first internal wall and the first outer wall and a further flow path between an opposing second side of the first internal wall and the second outer wall.

9. The system according to claim 8, wherein the first internal wall divides an internal space in the annular cooling flow passage such that the first flow path has a height that is less than a height of the further flow path.

10. The system according to claim 1, wherein the compressor is a high pressure compressor and the turbine is a high pressure turbine.

11. The system according to claim 1, wherein the annular cooling flow passage comprises a third portion arranged between the first outer wall and the second outer wall where the airflows from the first and second inlets coalesce within the annular cooling flow passage, the third portion of the annular cooling flow passage having a height greater than a distance between the first internal wall and the first outer wall, the third portion of the annular cooling flow passage being disposed towards the compressor end of the annular cooling flow passage in the direction from the compressor to the turbine.

* * * * *